United States Patent [19]

Yamada

[11] Patent Number: 5,318,393
[45] Date of Patent: Jun. 7, 1994

[54] TAP

[75] Inventor: Masao Yamada, Tokyo, Japan

[73] Assignee: Tanoi Mfg. Co., Ltd., Tokyo, Japan

[21] Appl. No.: 867,146

[22] Filed: Apr. 10, 1992

[51] Int. Cl.5 ............................................. B23G 5/06
[52] U.S. Cl. .................................... 408/222; 470/198
[58] Field of Search ............... 408/215, 216, 217, 219, 408/220, 222; 470/198

[56] References Cited

U.S. PATENT DOCUMENTS 832,380  10/1906  Hartness .......................... 470/198

FOREIGN PATENT DOCUMENTS 1534728  1/1990  U.S.S.R. .......................... 470/198

*Primary Examiner*—Daniel W. Howell
*Attorney, Agent, or Firm*—Abelman Frayne & Schwab

[57] ABSTRACT

In a tap having a lead part and a complete thread part contiguous to the lead part, a relief is formed on at least one of a leading flank and a following flank of each of a plurality of thread ridges formed on the rear end side of the lead part and each of a plurality of thread ridges formed on the front end side of the contiguous complete thread part, so that the portion of an internal thread having been cut already by the preceding cutting edge may not be cut again and widened by the succeeding cutting edge.

1 Claim, 5 Drawing Sheets

TAP

INDUSTRIAL FIELD OF USE

This invention relates to a thread cutting tap, and more particularly to such a tap which ensures a smooth thread cutting operation and improves the precision of an internal thread formed by cutting.

BACKGROUND OF THE INVENTION

A threaded portion of a tap used for cutting an internal thread in a workpiece consists of a lead part formed on the leading side and a complete thread part formed on the following side.

When such a tap is used to cut an internal thread in a workpiece, its lead part first cuts into the workpiece thereby gradually generating a thread groove, and the complete thread part then makes thread engagement with the groove to act as a guide guiding the advancing movement of the tap itself.

However, the tap used for cutting the internal thread in a workpiece has various different angular factors, such as, the rake or hook angle of each cutting edge at its lead part, the radial angle on the lead as well as the inclination angle at the circumference of each cutting edge, and the radial thread relief angle at the flank face of each cutting edge relative to the normal helical direction of the thread. In addition, the thrust that may be large or small is imparted to the tap itself. As a result, the advancing movement of the tap in its axial direction tends to fluctuate, and the force of reaction due to the resistance to cutting tends to act on the tap. This leads to such a problem that the front end of the generated internal thread engaged by the lead part of the tap tends to be widened or flared, resulting in an undesirable degradation of the dimensional precision of the flank faces of the generated internal thread.

With a view to deal with such a problem, various proposals for improvements have been made, as disclosed in, for example, JP-A-60-194425 (UM) which relates to a spiral fluted tap. According to the disclosure of the cited application, a planar negative relieving having a substantially constant width is formed to extend from the root towards the crest on the leading flank or the following flank along the line of intersection between the wall face of the flute and the flank of each thread ridge. However, it is apparent that, according to those proposals intending improvements, a large resistance is encountered during the cutting operation, because the negative relieving described above acts to effect plastic cutting rather than mechanical cutting. As a result, the phenomenon of frictional fusion similar to that encountered with a built-in edge of a turning tool tends to occur at the relieved portion. Therefore, with the increase in the number of times of use (cutting) of the tap, the dimensional precision of the flank faces of the finished internal thread has been inevitably degraded together with the shortened useful service life of the tap itself.

OBJECT AND SUMMARY OF THE INVENTION

With a view to solve the prior art problem pointed out above, it is an object of the present invention to provide a tap provided with means for improving the precision of the generated internal thread and improving also the useful service life of the tap itself.

According to one aspect of the present invention which attains the above object, there is provided a tap including a plurality of cutting edges formed on the rear end side of its lead part and a plurality of cutting edges formed on the front end side of its complete thread part contiguous to the lead part, wherein a relief is formed at a lower part of at least one of a leading flank and a following flank of each thread ridge to extend from the edge face towards a heel to converge on the root, and the height of the relief is equal to or smaller than that of the adjacent cutting edge located on the front end side along the helix of the tap thread.

According to another aspect of the present invention, there is provided a tap including a plurality of cutting edges formed on its complete thread part contiguous to those formed on its lead part, wherein a relief is formed at an upper part of at least one of a leading flank and a following flank of each thread ridge to extend from the edge face towards a heel to converge on the land.

In each of the two forms of the tap according to the present invention, an internal thread is generated in a workpiece by the portions of cutting edge lines corresponding to the remaining portions of the reliefs, and the tap itself is guided by the portions of the reliefs remaining on the flanks.

DETAILED DESCRIPTION OF THE PREFERRED EMBODIMENTS

Figure 5:
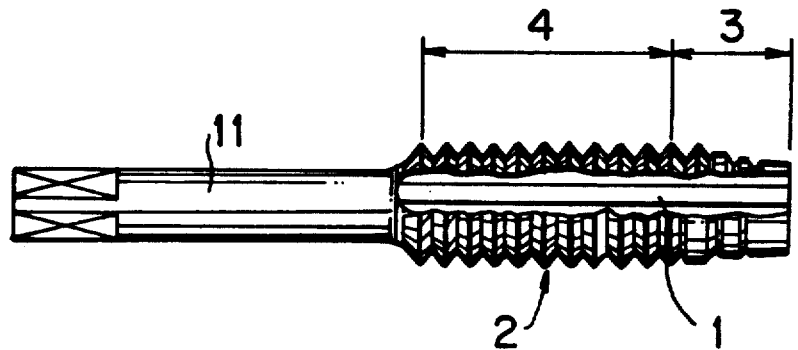
FIG. 5 is a side elevational view of one form of a tap to which the present invention is applied.

FIG. 5 shows a straight fluted tap of three flute type to which the present invention is applied. Referring to FIG. 5, the straight fluted tap having flutes 1 is generally designated by the reference numeral 2 and consists of a lead part 3 formed on the front end side, a complete thread part 4 formed contiguous to the lead part 3, and a shank part 11 formed contiguous to the complete thread part 4 to be grasped by a holding tool, such as, a tap holder.

Figure 1:
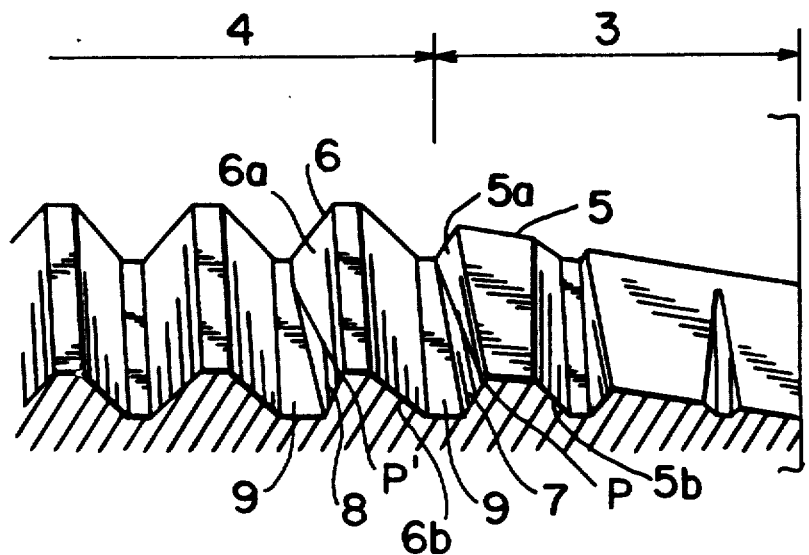
FIG. 1 is a perspective view showing part of the threaded portion of an embodiment of the tap according to the present invention.
Figure 2:
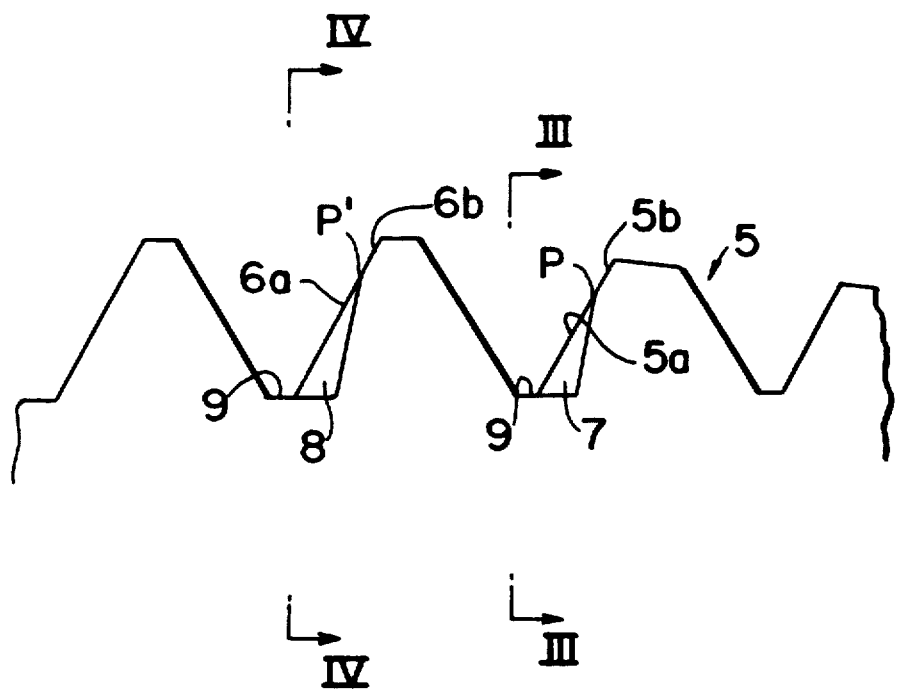
FIG. 2 is a side elevational view of the threaded portion shown in FIG. 1.
Figure 3:
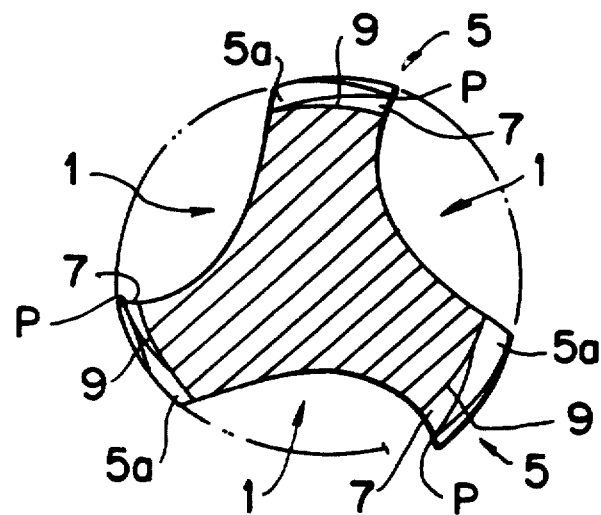
FIG. 3 is a sectional view taken along the Line III—III in FIG. 2.

An embodiment of the tap according to the present invention will now be described by reference to FIGS. 1 to 4. Referring to FIGS. 1 and 2, a relief 7 is formed at a lower part of a following flank 5a of each of a plurality of thread ridges 5 of the lead part 3, and a relief 8 is formed at a lower part of a following flank 6a of each of a plurality of thread ridges 6 of the complete thread part 4 contiguous to the lead part 3. Referring to FIG. 3 which is a sectional view of the illustrated embodiment taken along the line III—III in FIG. 2, the relief 7 at each thread ridge 5 of the lead part 3 has its apex P located on the side of a cutting edge line 5b and smoothly converges on the lower end, that is, the root 9 of the thread ridge 5. The apex P of the relief 7 has a height substantially equal to that of the adjacent cutting edge located on the front side along the helix. Therefore, the following flank of the generated internal thread having been cut by the preceding cutting edge of thread ridges 5 is located at the position of the relief 7 of the succeeding cutting edge of thread ridges 5.

Figure 4:
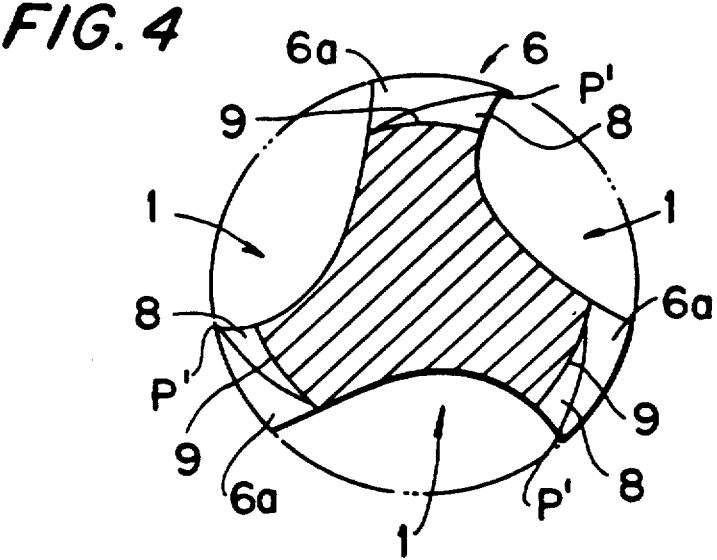
FIG. 4 is a sectional view taken along the line IV-IV in FIG. 2.

FIG. 4 is a sectional view taken along the line IV—IV in FIG. 2. It will be seen in FIG. 4 that, as in the case of the relief 7 at the thread ridge 5 of the lead part 3, the relief 8 at each thread ridge 6 of the complete thread part 4 extends smoothly from its apex P' on the side of a cutting edge line 6b to converge on the root 9, and the relief 8 has a height substantially equal to that of the last cutting edge of threads 5 of the lead part 3. In the illustrated embodiment, the relief 8 is provided at the complete thread part 4 on each of the first three thread ridges 6 disposed adjacent to each other along the helix.

In the thread cutting operation by the tap having the structure described above, generation of the internal thread in a workpiece is first started by the cutting edges of threads 5 of the lead part 3. As the tap rotates along the helix, each of the cutting edges of thread ridges 5 cuts to remove the material of the workpiece by a predetermined amount. Because, in the tap embodying the present invention, the relief 7 is provided on the following flank 5a, the internal thread is cut by the portion of the cutting edge line 5b without portion of the relief 7 on the following flank 5a.

In the case of the straight fluted tap to which the present invention is applied, a pressure acts on the following flank 5a of the thread ridge 5 due to the force of reaction attributable to the resistance against cutting. However, because of the provision of the relief 7 at the following flank 5a as described above, the cutting edge line 5b does not contact the corresponding portion of the workpiece having been cut already, and any extra cutting, that is, widening of the profile of the internal thread cannot occur. In the meantime, with the rotation of the tap, the flank 5a gradually and continuously engages the root 9 to guide the tap. Thus, the tap embodying the present invention does not cause widening of the profile of the internal thread and ensures the desired dimensional precision even when fluctuation of the axial advancing movement of the tap may occur at the beginning of the thread cutting operation or the cutting operation may be encountered with the force of reaction due to the resistance against cutting.

As the tap is further advanced, the thread cutting by the lead part 3 shifts to that by the complete thread part 4. In the illustrated embodiment, the relief 8 is also provided at each of the first three thread ridges 6 of the complete thread part 4 along the helix. Therefore, even when the thread ridge 6 may be pressed towards the following flank 6a by the force of reaction due to the resistance against cutting, the cutting edge line 6b does not contact a substantial part of the workpiece having been cut already by the cutting edges of thread ridges 5 of the lead part 3. Thus, undesirable widening of the profile of the internal thread does not occur, and the desired dimensional precision can be reliably secured. After the thread cutting by the lead part 3 shifts to that by the complete thread part 4, the tap completely engages the thread, so that fluctuation does not occur in the axial advancing movement of the tap. Also, the value of the pressure caused by the force of reaction described above becomes sufficiently small at the fourth and succeeding thread ridges 6, so that the problem of widening of the thread profile cannot occur.

Figure 8:
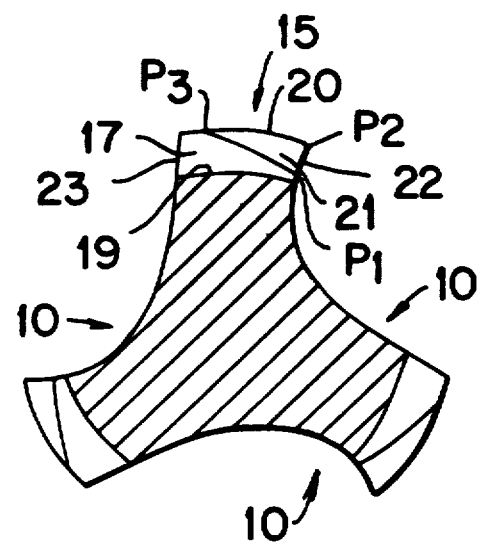
FIG. 8 is a sectional view taken along the line VII—VII in FIG. 7.
Figure 9:
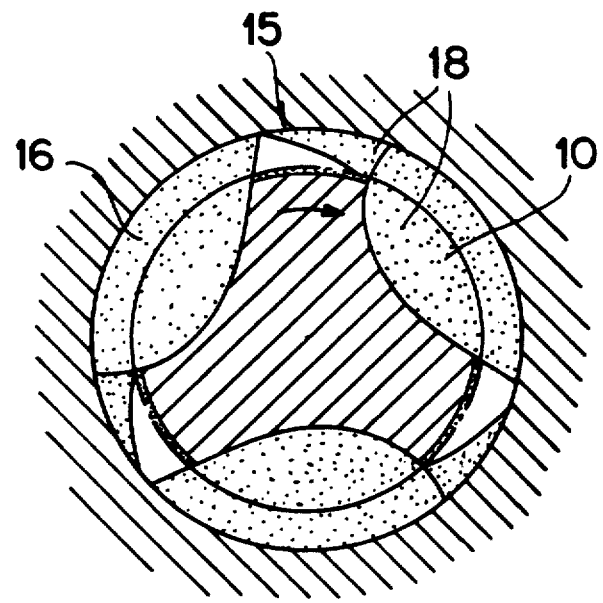
FIG. 9 is a sectional view showing the state of engagement between the tap shown in FIG. 7 and an internal threaded groove.

Another embodiment of the tap according to the present invention will now be described by reference to FIGS. 6 to 9. Referring to FIGS. 6 to 9, a relief 21 is formed at an upper part of a following flank 17 of each of a plurality of thread ridges 15 of the complete thread part 4 contiguous to the lead part 3. In the illustrated second embodiment, this relief 21 has an apex P1 located adjacent to the root 19 on the side of the following flank 17 relative to a cutting edge line 22 and an apex P2 at the crest 20, as best shown in FIG. 8. This relief 21 smoothly converges on the rear end of the intersection between the following flank 17 and the crest 20 of the cutting edge 15, that is, on a point P3 located adjacent to a heel 23. Further, in the illustrated embodiment, the relief 21 having the shape described above is formed on each of first three thread ridges 15 disposed adjacent to each other on the complete thread part 4 along the helix.

In the tap having the structure described above, generation of an internal thread groove 16 in a workpiece is first started by the cutting edges of the lead part 3. With the rotation of the tap along the helix, each cutting edge cuts to remove the material by a predetermined amount.

As described already, the thread ridge 15 is pressed towards the following flank 17 by the force of reaction due to the resistance against cutting. However, because relief 21 is formed on the following flank 17 at each of the first three thread ridges 15 of the complete thread part 4 along the helix, the cutting edge line 22 does contact the portion of the workpiece corresponding to the relief 21 in spite of cutting by the cutting edges of the lead part 3. Therefore, any extra cutting, that is, widening of the profile of the internal thread groove 16 does not occur, so that the desired high dimensional precision of the internal thread can be secured.

Further, in this second embodiment, the following flank 17 too has its upper end located on the crest 20 adjacent to the heel 23, so that the primary function of the complete thread part 4 to guide the tap is not lost.

After the initial cutting of the internal thread groove 16 by the lead part 3, the tap is advanced, and cutting of the internal thread groove 16 by the lead part 3 shifts to that by the complete thread part 4. In this case, a cooling liquid 18 flows from flutes 10 towards and into the relief 21 formed on the following flank 21 of each thread ridge 15 as shown in FIG. g. Because the relief 21 terminates in the vicinity of the heel 23 as described above, the cooling liquid 18 flows towards the crest 20 of each thread ridge 15 as shown in FIG. g. As a result, the area including the crests 20 of the thread ridge 15 is cooled by the cooling liquid 18, so that undesirable chip-off of the crest 20 due to thermal fatigue or undesirable partial tearing of the internal thread groove 16 can be avoided.

The value of the pressure imparted to the complete thread part 4 becomes sufficiently small in the case of the fourth and succeeding thread ridges 15. Therefore, the aforementioned problem attributable to the frictional heat resulting form impartation of the pressure from the internal thread groove 16 to the thread ridge 15 would not almost take place.

Figure 10:
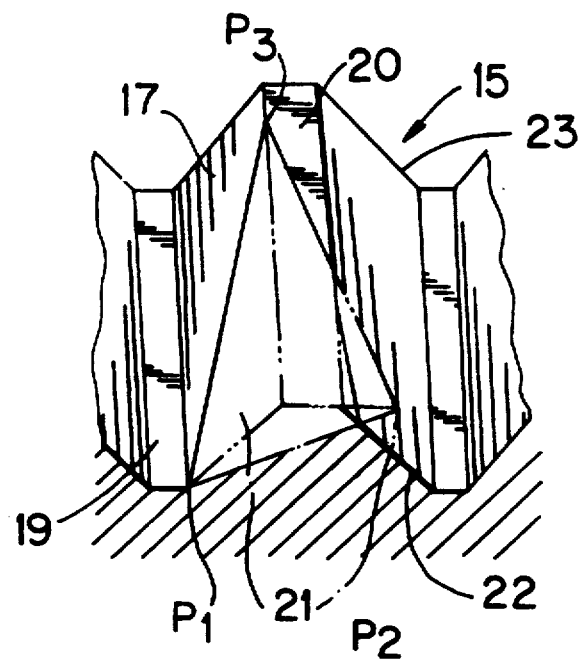
FIG. 10 is an enlarged perspective view of part of still another embodiment of the tap according to the present invention.
Figure 6:
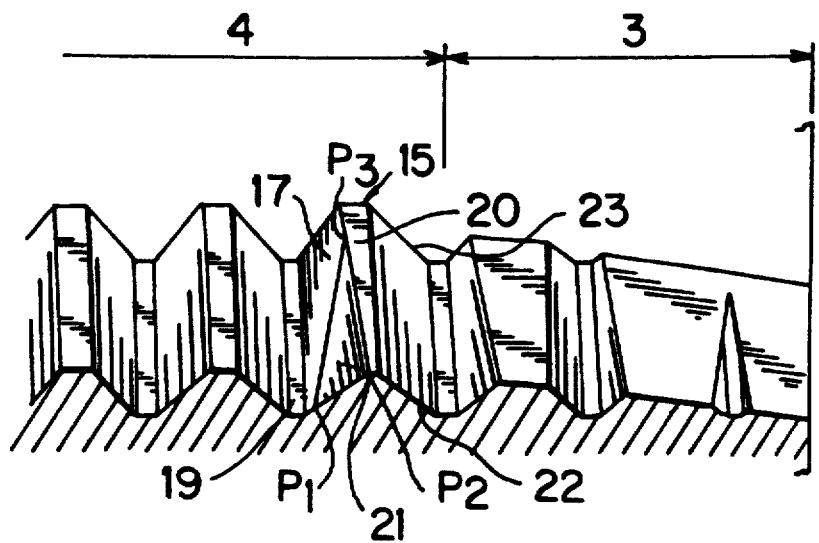
FIG. 6 is a perspective view showing part of the threaded portion of another embodiment of the tap according to the present invention.
Figure 7:
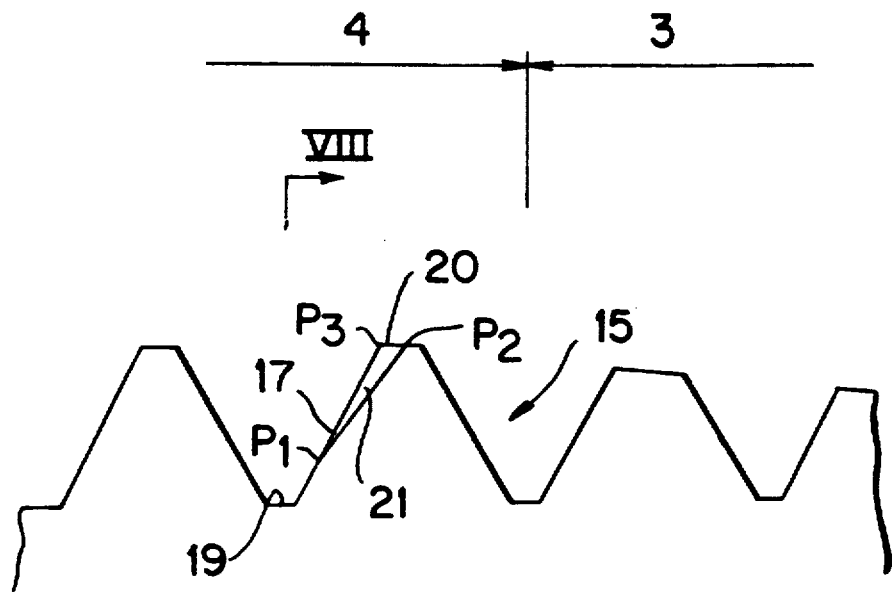
FIG. 7 is a side elevational view of the threaded portion shown in FIG. 6.

The present invention is in now way limited to the specific embodiments described in detail above. For example, the present invention may be applied to a tap having an even number of flutes, such as, a four-fluted tap or a spiral fluted tap having a spiral flute, although an application of the present invention to a three-fluted tap has been described by way of example. Further, the shape of the relief is in no way limited to those referred to in the illustrated embodiments. As shown in FIG. 10, the upper apex (P2 in FIG. 10) may be located at a virtual position beyond the crest, or the convergence point on the crest side may be located at any desired position, such as, the middle point on the line of intersection between the flank and the crest.

According to the result of an experiment, it has been confirmed that a satisfactory internal thread can be generated when the reliefs formed on the complete thread part contiguous to the lead part are those equally divided in the circumferential direction and balanced in the radial direction. For example, in the case of a tap of four flute type, reliefs are preferably formed on at least two opposing thread ridges among the circumferential four threads ridges along the helix on the complete thread part contiguous to the lead part, and, in the case of a tap of five flute type, reliefs are preferably formed on all of the five threads ridges. Further, when many cutting edges are adversely affected by the force of reaction due to the resistance against cutting, reliefs are preferably formed on all of thread ridges.

Further, in the case of application of the present invention to a spiral fluted tap, the force of reaction imparted to the tap tends to change due to the correlation between the helical direction of the thread and the spiral direction of the flute. Also, in the case of application of the present invention to a straight fluted tap, the force of reaction imparted to the tap tends to change depending on the inclination of the lead part. Therefore, in these cases, reliefs may be formed on the leading flanks. Further, in order to further improve the dimensional precision in each of the straight fluted tap and the spiral fluted tap, reliefs may be formed on both the leading and following flanks.

In the tap according to the present invention, reliefs are formed on the thread ridges of its lead part and on those of its complete thread part, so that the portion of a workpiece having been cut by one of the cutting edges may not be cut again by the next adjacent cutting edge. Therefore, the dimensional precision of the generated internal thread can be satisfactorily maintained, and yet the useful service life of the tap is not shortened unlike the prior art improved tap.

Further, the provision of the relief at the upper part of each of the thread ridges of the complete thread part is advantageous in that the relieved portions can be satisfactorily cooled by a cooling liquid supplied to the crests, so that undesirable chip-off of the crest and undesirable partial tearing of the generated internal thread attributable to frictional heat generated due to engagement with the internal thread groove can be avoided. Consequently, the useful service life of the tap can be extended, and the dimensional precision of the generated internal thread can be satisfactorily maintained.

I claim:

1. A tap including a plurality of thread ridges [5] providing a tap thread in the form of a helix formed on a rear end side of a lead part [3] of said tap, and a plurality of thread ridges [6] formed on a front end side of a complete threaded part [4] of said tap contiguous with said lead part [3], wherein a relief [7,8] is formed at a lower part of at least one of a leading flank [5e, 6e] and following a flank [5a, 6a] of each thread ridge [5,6 ] to extend from the edge face [5d, 6d] towards a heel [5c, 6c] to converge on the root, the edge face side height [h] of an adjacent thread ridge located on said front end side of said tap along said helix of said tap thread.

* * * * *

UNITED STATES PATENT AND TRADEMARK OFFICE
CERTIFICATE OF CORRECTION

PATENT NO. : 5,318,393

DATED : June 7, 1994

INVENTOR(S) : Yamada

It is certified that error appears in the above-indentified patent and that said Letters Patent is hereby corrected as shown below:

The title page, showing the illustrative figure, should be deleted an substitute therefor the attached page.

Signed and Sealed this

Eleventh Day of July, 1995

Attest:

BRUCE LEHMAN

Attesting Officer

Commissioner of Patents and Trademarks

United States Patent [19]

Yamada

[11] Patent Number: 5,318,393
[45] Date of Patent: Jun. 7, 1994

[54] TAP

[75] Inventor: Masao Yamada, Tokyo, Japan

[73] Assignee: Tanoi Mfg. Co., Ltd., Tokyo, Japan

[21] Appl. No.: 867,146

[22] Filed: Apr. 10, 1992

[51] Int. Cl.⁵ .................................... B23G 5/06
[52] U.S. Cl. ............................. 408/222; 470/198
[58] Field of Search ............ 408/215, 216, 217, 219, 408/220, 222; 470/198

[56] References Cited
U.S. PATENT DOCUMENTS
832,380  10/1906  Harness .................... 470/198

FOREIGN PATENT DOCUMENTS
1534728  1/1990  U.S.S.R. .................... 470/198

Primary Examiner—Daniel W. Howell
Attorney, Agent, or Firm—Abelman Frayne & Schwab

[57] ABSTRACT

In a tap having a lead part and a complete thread part contiguous to the lead part, a relief is formed on at least one of a leading flank and a following flank of each of a plurality of thread ridges formed on the rear end side of the lead part and each of a plurality of thread ridges formed on the front end side of the contiguous complete thread part, so that the portion of an internal thread having been cut already by the preceding cutting edge may not be cut again and widened by the succeeding cutting edge.

1 Claim, 5 Drawing Sheets

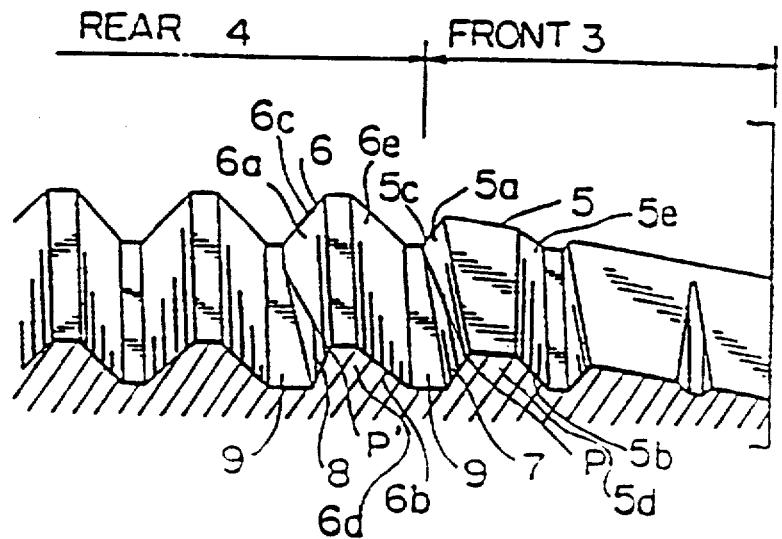

UNITED STATES PATENT AND TRADEMARK OFFICE
CERTIFICATE OF CORRECTION

PATENT NO. : 5,318,393
DATED : June 7, 1994
INVENTOR(S) : YAMADA

It is certified that error appears in the above-indentified patent and that said Letters Patent is hereby corrected as shown below:

In claim 1, line 10: insert --of said relief being equal to or smaller than the height [h]-- so that claim 1 reads as follows:

A tap including a plurality of thread ridges [5] providing a tap thread in the form of a helix formed on a rear end side of a lead part [3] of said tap, and a plurality of thread ridges [6] formed on a front end side of a complete threaded part [4] of said tap contiguous with said lead part [3], wherein a relief [7,8] is formed at a lower part of at least one of a leading flank [5e,6e] and following a flank [5a,6a] of each thread ridge [5,6] to extend from the edge face [5d,6d] towards a heel [5c,6c] to converge on the root, the edge face side height [h] <u>of said relief being equal to or smaller than the height [h]</u> of an adjacent thread ridge located on said front end side of said tap along said helix of said tap thread.

IN THE DRAWINGS:

Insert the reference numerals "5c, 5d, 5e, 6c, 6d and 6e in Fig. 1, and insert the reference numerals "h and H" in Fig. 3 as shown in the drawings below.

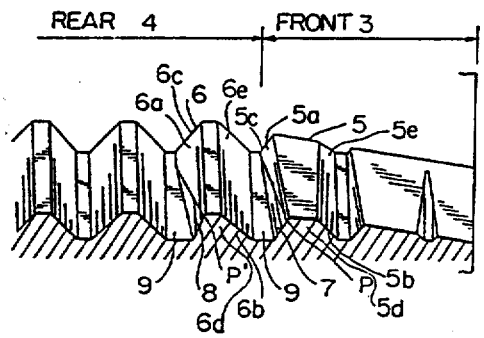

FIG. 1

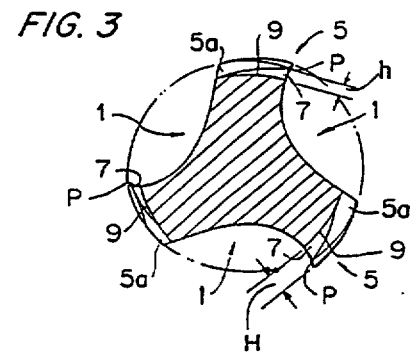

FIG. 3